United States Patent [19]

Kuhlmann

[11] 4,244,421

[45] Jan. 13, 1981

[54] PROCESS AND AN APPARATUS FOR COOLING OF WASTE GAS BENDS

[75] Inventor: Herbert Kuhlmann, Bochum, Fed. Rep. of Germany

[73] Assignee: Sidepal S.A. Societe Industrielle de Participations Luxembourgeoise, Luxembourg, Luxembourg

[21] Appl. No.: 926,378

[22] Filed: Jul. 20, 1978

[30] Foreign Application Priority Data

Aug. 3, 1977 [DE] Fed. Rep. of Germany ....... 2734922

[51] Int. Cl.³ ........................... F28D 7/00; F28F 3/12
[52] U.S. Cl. ....................................... 165/1; 165/169; 122/138; 432/223
[58] Field of Search ................... 165/169, 1; 122/137, 122/138; 432/223; 179

[56] References Cited

FOREIGN PATENT DOCUMENTS 1408919 6/1972 Fed. Rep. of Germany .......... 165/169

Primary Examiner—Albert W. Davis
Assistant Examiner—Margaret A. Focarino
Attorney, Agent, or Firm—Silverman, Cass & Singer, Ltd.

[57] ABSTRACT

Process of cooling waste gas bend and apparatus for carrying out same, said process comprising removing concentrated heat at said bend by feeding coolant at an adjustable pressure through cooling channels longitudinally disposed along a selected sector of the cross-section of the bend, the channels being of equal flow cross-section within the entire circuit, said heat being reduced to a level prevailing in the cool sections of the bend portion of the casing (i.e. the cooler sections of the cross-section).

5 Claims, 5 Drawing Figures

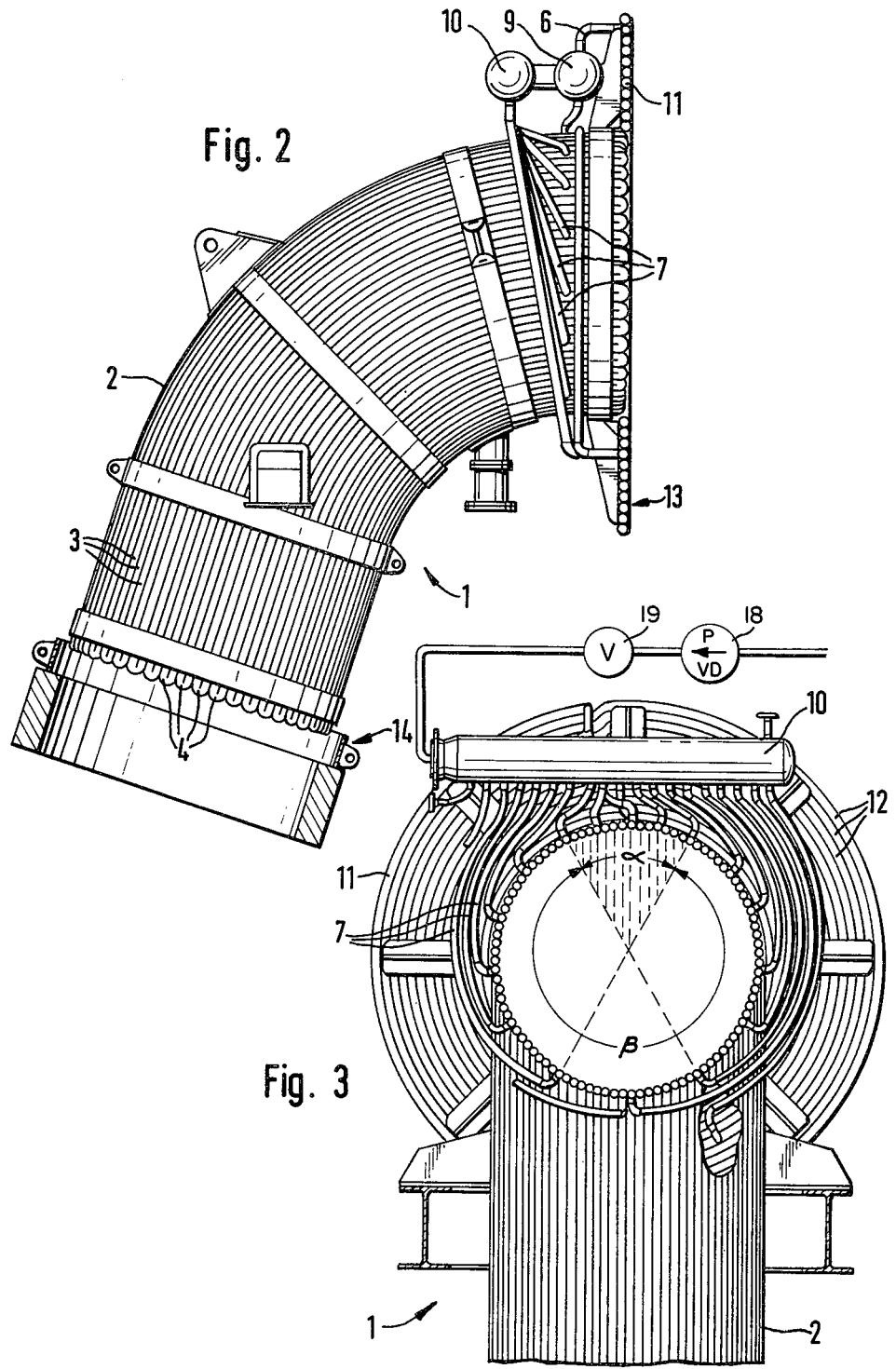

PROCESS AND AN APPARATUS FOR COOLING OF WASTE GAS BENDS

BACKGROUND OF THE INVENTION

The invention relates to a process for the cooling of waste gas bends and to an apparatus for the performance of the process, consisting of a waste gas bend with a cooled pipe wall.

Contrary to waste gas flues, waste gas bends for industrial furnaces are exposed to greater thermal loads than any other components of the waste gas system in industrial plant. A waste gas bend serving to deflect the flow of waste gas by an angle of about 90° in direct contact with the cover of the furnace is exposed to incomparably high thermal and mechanical stresses which can in no way be compared to the problems arising with waste gas flues, which mainly take a vertical course and only have slight bends, in addition to which the waste gas temperatures occurring therein are far lower. The waste gas bends in industrial furnaces thus still have the shortest length of life, as the walls are exposed to waste gas temperatures of 1400°–1600°, leading to very high differential stresses and to local disintegration of material and causing the waste gas bend to undergo premature destruction.

Waste gas bends with double walls serving to convey a cooling medium have hitherto been made from sheet metal segments with angular portions. These known waste gas bends have certain disadvantages which impede the flow required for the deflection of the hot waste gases, since considerable turbulence occurs at each angular joint, causing localisation of heat, phenomena which cannot be controlled by means of the known cooling systems. Bubbles of steam cannot be prevented from forming at these points, inevitably resulting in the destruction of the waste gas bends.

The further causes of this premature destruction of the known types of waste gas bend reside in the fact that the hottest zones, which in general are situated in those portions of the waste gas bend in which the cross section is the maximum, are transmitted by cooling media to the wall parts of the cooler sectors of the cross section. With waste gas flues with the known type of pipe wall, for instance, it has already been suggested that the coolant should be allowed to flow through the pipe wall subdivided into vertical sections, the speed of the coolant in the individual sections being regulated in accordance with the quantity of heat occuring such as disclosed in the German patent No. 1408919.

The teaching provided by the said patent, however, is not applicable to waste gas bends, as the flow of coolant under the force of gravity is not capable of controlling local peak temperatures such as occur in waste gas bends and of removing the heat which accordingly occurs. One of the main drawbacks, however, is the fact that the intensified removal of the heat in certain portions of the waste gas cross section is transmitted over the entire length to other parts of the wall of the waste gas flue. This causes, in the sections of the waste gas flue as well, stresses due to temperature differences, where otherwise advantageous distribution of heat prevailed in the pipe wall. The temperature differences in this known apparatus were not balanced out over the complete waste gas system but merely transferred to other parts of the wall, so that the destructive effect due to heat differences could not be eliminated. Furthermore, the flow cross section of the cooling circuit in this suggested system is constricted by control valves, so that the elimination of heat, in the temperature range in which the bubbles of steam form, cannot be ensured.

The purpose of the present invention is to develop a process which solves the problem connected with the required cooling in waste gas bends, enabling local excess heating in the wall of a pipe bend to be avoided and reliably preventing the production of stresses due to temperature differences in the entire pipe wall surface, and also to design an apparatus enabling the process covered by this invention to be carried out.

SUMMARY OF THE INVENTION

In order to achieve the object to which the invention relates, it is proposed that for the cooling of waste gas bends with the use of cooling walls known per se, and having cooling channels taking the same direction as the flow of the waste gases, the concentrated heat occuring in the direction of waste gas flow in the casing of a waste gas bend, in the zone of a certain sector of the cross section, should be removed, within the actual zone in which it occurs, by means of adjustable coolant pressure and coolant throughput, via cooling channels which are situated in the longitudinal direction in the casing of a certain sector of the cross section, and which are of equal flow cross section within an entire cooling circuit, the temperature of the casing being reduced to the level prevailing in the cooler parts of the casing or cooler sectors of the cross section or in these separate cooling circuits.

This ensures that the hottest zones, which in general are situated in the zone of the maximum radii of the walls of the bend, are confined to the longitudinal range of a certain sector of the total cross section and are not transmitted to the adjacent cooler parts of the wall which correspond to the remaining sectors of the cross section. According to a further proposal included in the present invention the temperature which is thus balanced out over the entire casing of the pipe bend undergoes further proportional regulation so that the compensated temperature of all the cooling circuits can be adjusted to a certain desired operating temperature.

The process to which the invention relates enables tension cracks caused by high temperature differences in the casing of the bend to be largely obviated. Extensive practical tests have shown that local heat peaks, which generally cause the formation of bubbles of steam and thus lead to the collapse of the cooling circuit, are reliably avoided by the forced cooling with the invariably constant flow cross sections throughout the entire cooling circuit or in the individual cooling circuits within certain sectors of the cross section.

It has been found that the length of life of a waste gas bend designed in accordance with this invention can be more than doubled by comparison with the waste gas bends hitherto known.

For the performance of the process to which the invention relates an apparatus is proposed in which use is made of pipe walls known per se and in which the pipes carrying the cooling agent are adjacent to one another and welded together and the cooling can be effected in sections over the periphery of the waste gas flue, which comprises individual pipe units, which are bent in accordance with the desired radius of curvature, are welded in the direction of flow of the waste gases and which are to be so arranged that at least two adjacent pipes are connected at the end of the radius of curvature to form cooling coils of any desired number of turns, these coils being in each case directly connected at the end of the radius of curvature to a supply pipe and to a discharge pipe for a coolant, the individual cooling coils having a constant flow cross section from the coolant supply pipe to the coolant discharge pipe and being traversed by an uninterrupted controllable or adjustable flow of coolant.

According to a further proposal included in the invention, particularly advantageous cooling coils are formed by expanding the ends of each two adjacent pipes in such a way that those walls of the two pipe ends which are in contact with each other are welded together, more or less parallel with each other, over a length approximately corresponding to the diameter of a pipe, the two open pipe ends being interconnected by a suitably shaped deflecting cap, a constant flow cross section being maintained, and are welded to the pipe ends.

BRIEF DESCRIPTION OF THE DRAWINGS

FIGS. 2 and 3 are an example of a waste gas bend according to the invention.

DESCRIPTION OF PREFERRED EMBODIMENT the purpose of forming a cooling coil.

Figure 1:
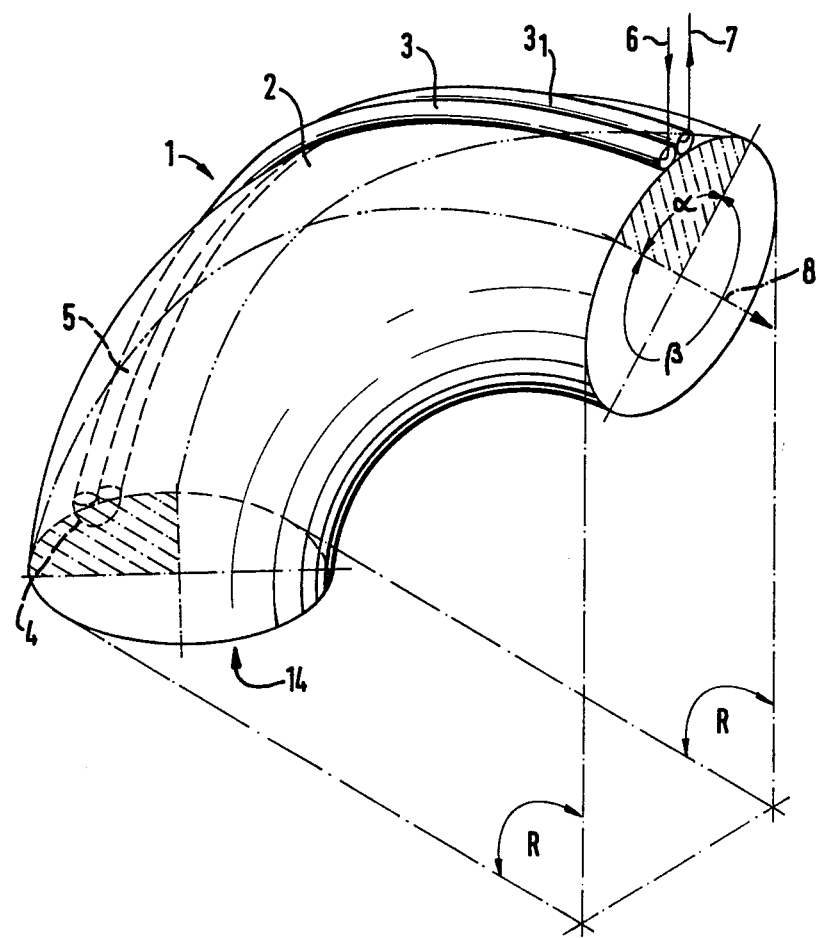
FIG. 1 is a schematic diagram of a waste pipe bend.

The schematic diagram in FIG. 1 shows a pipe bend 1 in which the current of waste gas is deflected by 90°. The maximum thermal loading on the casing 2 takes place approximately in the zone of the sector α of the said casing. The casing 2 consists of individual pipe unit 3,3$_1$, which are interconnected by a deflecting cap 4 to form a cooling coil 5 and which form a closed cooling circuit. The entry 6 and the discharge 7 of a coolant take place at one end of the hottest zones in the casing 2, ensuring rapid removal of the heat from the corresponding zone of the section. The profiled pipe wall 2 of the longitudinally welded pipes are particularly advantageous for the pipe bend 1 to which the invention relates, as the enlarged surface rapidly absorbs the heat in a manner known per se and also conveys the flow of waste gas 8 to the radius of curvature without any turbulence. Dangerous localisations of heat in the wall 2 and the transference of the heat to the wall parts which are only subject to slight thermal loads are thereby avoided.

FIGS. 2 and 3 illustrate an example of the pipe bend 1 according to the invention. The inlets 6 and the discharge conduits 7 of the individual cooling circuits are situated at the upper end of the pipe bend. In this example the forced cooling circuit is provided by a distributor 9 to which are connected the individual cooling circuits, of which the flow cross sections and flow resistances are adapted to the thermal conditions of the respective sections. The discharge 7 from each of the cooling circuits takes place via a collector 10.

The waste gas bend 1 according to the invention is also provided with a water cooled flange 11 known per se. The flange 11, according to the invention, likewise consists of a pipe wall known per se. The pipes 12 are in this case welded together in spiral conformation and connected to one or more separate cooling circuits. This enables thermal stresses to be avoided in the connecting flange 11 likewise and also ensures a flat connecting plane 13 as well as preventing transference of the heat of the flange to the wall 2 of the waste gas bend.

Figure 4:
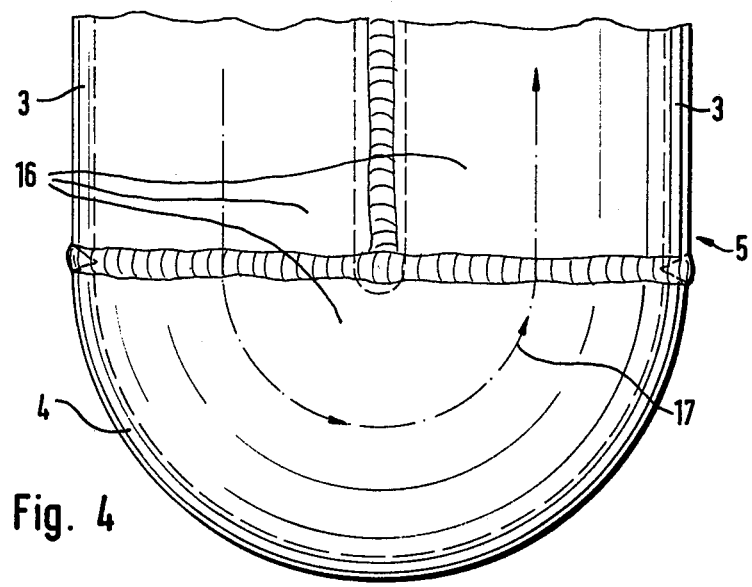
FIGS. 4 and 5 show the connection of two cooling pipes for the purpose of forming a cooling coil.
Figure 5:
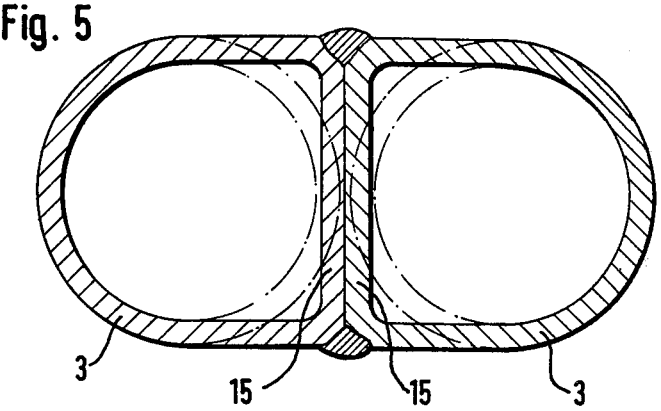

The ends of the cooling coils 3 are provided with the deflecting caps 4, which do not go beyond the periphery of the outer pipe wall at the entry 14 to the pipe bend. This is particularly important in view of the local constructional requirements arising with industrial furnaces. FIGS. 4 and 5 show the most favourable deflection 17 of the coolant, from the point of view of the flow required, in the cooling coils 5. In particular, FIG. 5 shows how the pipe ends 3 are expanded, the walls 15 in contact with each other being welded together in an adjacent and approximately parallel position. The pipe ends 3 thus welded are then closed with a deflecting cap 4, to form a cooling coil 5 of equal flow cross section as shown in FIG. 1 with extremely satisfactory flow properties.

The particular means employed to adjust the coolant pressure and throughput are conventional. As clearly implied, circulation of coolant through cooling coils is effected by connecting the inlet 6 to a source of coolant conventionally through a circulating pump 18, the operating pressure of which being adjustable, in accordance with the demand.

Throughput in flow systems conventionally can be controlled or adjusted by employing a flow control valve 19, this expedient per se being old in the art where flow systems are concerned.

What we claim is:

1. A process for the cooling of waste gas bends with the use of cooling walls and having cooling channels taking the same direction as the flow of waste gases; removing the concentrated heat occurring in the direction of waste gas flow in the casing of a waste gas bend, in the zone of a certain selected sector of the cross section within the actual zone in which it occurs, said removal being effected by flowing coolant under adjustable coolant pressure and coolant throughput through cooling channels disposed along the longitudinal direction in the casing of a certain selected sector of the cross section, said cooling channels being of equal flow cross section within an entire cooling circuit and the temperature being reduced to the level prevailing in the other remaining cooler sectors of the said cross section of the bend portion of the casing.

2. A process as claimed in claim 1, wherein the temperature of all the cooling circuits is balanced out in the casing of the waste gas bend and is regulated proportionally to a certain desired operating temperature.

3. A waste gas bend consisting of a pipe wall including plural pipes carrying a cooling agent placed adjacent to one another and welded together so that cooling can be effected in certain selected sections over the periphery of the waste gas flue, said plural pipes comprising individual pipe units bent in accordance with the desired radius of curvature, said pipes being welded in the direction of flow of the waste gases in at least two adjacent pipes, said pipe units being connected at the end of the radius of curvature thereof to define cooling coils having plural turns, said coils being directly connected at the end of the said radius of curvature to a coolant supply pipe and to a coolant discharge pipe, said individual cooling coils having a constant flow cross section leading from the coolant supply pipe to the coolant discharge pipe and capable of being traversed by a non-interrupted controllable flow of coolant.

4. A waste gas bend as claimed in claim 3, wherein in each case two adjacent pipe ends of a cooling coil are expanded in such a way that those walls of the two pipe ends which are in contact with each other are welded together generally parallel with each other over a length approximately corresponding to the diameter of a pipe, the two open pipe ends being interconnected by a deflecting cap and interconnecting the two open pipe ends, welded thereto whereby a constant flow cross section is maintained.

5. A waste gas bend as claimed in claim 3, wherein said waste gas bend has a flange, said flange being capable of being cooled and comprising at least one spirally bent cooling coil.

* * * * *